Nov. 21, 1933.   P. A. RAAB   1,935,991
AUTOMOBILE TIRE HOLDER
Filed Dec. 9, 1930
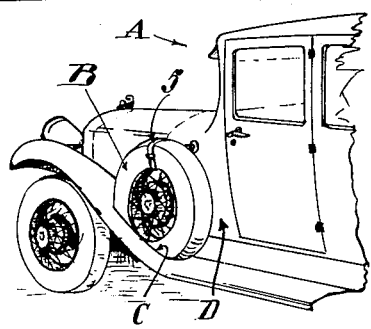
FIG. 1.
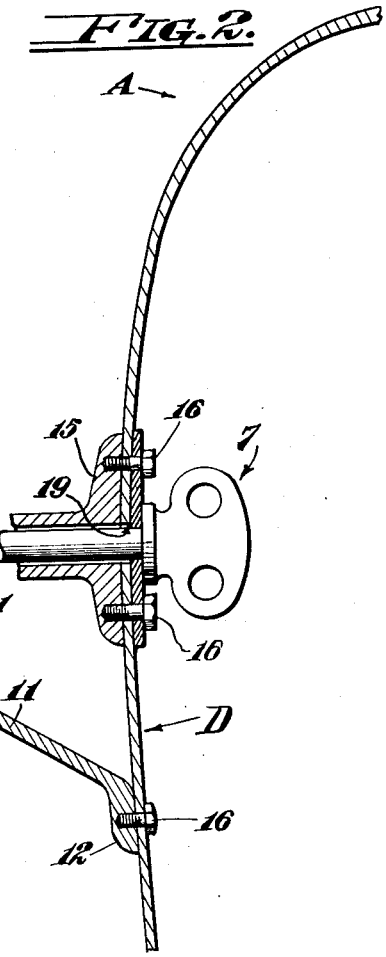
FIG. 2.
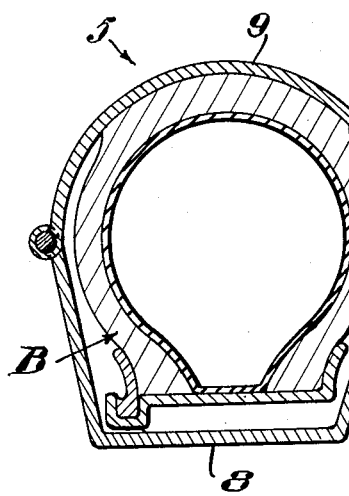
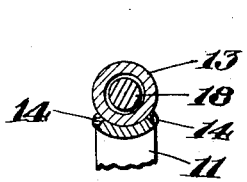
FIG. 3.   FIG. 4.
Inventor
Philip A. Raab.
By R. S. Berry
Attorney Patented Nov. 21, 1933

1,935,991

UNITED STATES PATENT OFFICE 1,935,991

AUTOMOBILE TIRE HOLDER

Philip A. Raab, Los Angeles, Calif.

Application December 9, 1930. Serial No. 501,024

2 Claims. (Cl. 224—29)

The present invention has to do with means for holding and locking spare tires against theft or unauthorized removal from automobiles.

An object of the invention is to provide a comparatively simple and inexpensive spare tire holder which consists of few parts, may be readily and easily installed upon a closed automobile and utilized in a particularly efficacious manner without the use of a lock and key therefor to safeguard a spare tire or tires against unauthorized removal when the doors of the automobile are locked.

Another object is to provide a spare tire holder of the character described which makes possible the locking of the tire against unauthorized removal through the simple expediency of securing the holder in place with threaded fastening elements access to which for effecting removal of the holder or release of the tire may be had from the interior of the car only, whereby on locking the doors of the car removal of the tire is prevented.

A further object is to provide a tire holder of the character described which will prevent unauthorized removal of the tire whether the tire is inflated or deflated as long as unauthorized access to the interior of the car is prevented.

With the foregoing objects in view, together with such other objects and advantages as may subsequently appear, the invention resides in the parts and in the combination, construction and arrangement of parts hereinafter described and claimed and illustrated by way of example in the accompanying drawing, in which:

Figure 1 is a fragmentary perspective view of an automobile showing my tire holder installed thereon;

Figure 2 is an enlarged fragmentary vertical sectional view of the tire holder showing parts of the automobile and the manner of installing the holder;

Figure 3 is a sectional view taken on line 3—3 of Figure 2;

Figure 4 is a sectional view taken on line 4—4 of Figure 2.

One embodiment of the invention, as shown in detail in the accompanying drawing, comprises a spare tire holding member 5, a means 6 for affixing the member 5 to a closed automobile such as the one A here shown, and a means 7 for releasably securing the member 5 to the spare tire B in such manner that unauthorized removal of the tire from the tire supporting rack or support C therefor on the automobile, is prevented while the doors of the automobile are locked. In other words, the device of this invention requires that access to the interior of a closed automobile be had in order to effect the removal of the tire from its rack and tire holding means 5.

In the present embodiment, the device of this invention is arranged to hold and lock a spare tire which is carried in the support C, as shown in Figure 1, but it is obvious that a tire carried alongside any wall of a closed car body may be held in accordance with this invention, inasmuch as the means 5 as well as the means 7 are readily adapted to be installed to the rear as well as the side walls of the auto body, with the means 7 arranged to be operated to release the tire holding means 5 only when access is had to the interior of the car.

As here shown, the tire holding member 5 is in the form of a tire encompassing loop comprised of a fixed section 8 and a hinged section 9 whereby the loop may be opened and closed to provide for the securing and releasing of the tire. The shape of the loop is such that it will conform closely to the tire and will have the hinged section 8 disposed uppermost and in a position to extend around the upper part of the tire with the free end of the said section next to the side or body of the automobile whereby said end may be locked by the means 7.

The means 6 for securing the tire holder 5 in place comprises a strap like bracket 11 formed as a continuation of the fixed section 8 of the holder 5 and arranged to be secured at its end 12 to the adjacent side wall D of the automobile. The means 6 may also be said to include a tubular member 13 fixedly secured near its outer end as at 14 preferably by being welded to the bracket 11. The inner end of the tubular member 13 is provided with a flange 15 disposed to abut the outer side of the wall D of the automobile.

To secure the parts 11 and 13 to the automobile so that unauthorized removal thereof and the entire device from the automobile is prevented, when the doors of the latter are locked, I employ screw fastenings 16 which are inserted through the wall D from the interior of the automobile and have threaded engagement with the end 12 and flange 15. The heads of the fastenings 16 in being disposed interiorly of the closed automobile make access to said interior necessary to remove the fastenings and such access is of course prevented when the doors of the car are locked.

The means 7 for releasably locking the tire holder 5 or more specifically the hinged section 9 in tire holding position, comprised a bolt 18 adapted to be inserted through an aperture 19 in the wall 9 and through the tubular member 13 whereby the threaded end 20 thereof may be threadedly engaged in a nut like enlargement 21 provided on the free end of said hinged section. On its inner end the bolt 18 has an enlarged head 22 serving as a handle to facilitate the turning of said bolt interiorly of the automobile.

It should be noted that the nut like enlargement 21 comes to rest in registration with the opening at the outer end of and in engagement with the tubular member 13 whereby the screw 18 may be readily screwed into and out of threaded engagement with said enlargement.

It will now be seen that the holder of this invention is subject to ready installation on various makes of closed cars and that it may be easily manipulated to lock a spare tire to the car without necessitating the use of a padlock or the like, inasmuch as the means for operating the holder to release the tire can only be operated from the interior of the car and is inaccessible for unauthorized operation when the doors of the car are locked.

The tubular member 13 and nut like enlargement 21 cover the bolt 18 in such manner that access to and unscrewing thereof as necessary to release the hinged section 9 are positively prevented at all points exteriorly of the car.

The particular manner of constructing and assembling the holder 5, attaching means 6 and operating means 7 provides for a strong and durable holder which will effectively resist all efforts to effect unauthorized removal of the spare tire.

I claim:

1. In a spare tire holder for automobiles, a tire encircling member comprised of a fixed section, a movable section hinged to the fixed section and provided with a screw threaded opening, a bracket for supporting said fixed section on an automobile, a tubular member fixed to said bracket and adapted for connection with an automobile, and a bolt rotatable in said tubular member and threadedly engaged with the threaded opening of said hinged section.

2. In a spare tire holder for automobiles, a tire encircling member comprised of a fixed section, a movable section hinged to the fixed section and provided with a screw threaded opening, means for supporting said fixed section on an automobile, a tubular member connected with an automobile, a bolt rotatable in said tubular member and threadedly engaged with the threaded opening of said hinged section, and a portion of the bolt exposed at one end of said tubular member interiorally of the automobile.

PHILIP A. RAAB.